United States Patent
Dayde et al.

(10) Patent No.: US 10,002,465 B2
(45) Date of Patent: Jun. 19, 2018

(54) CREATION OF BOUNDING BOXES ON A 3D MODELED ASSEMBLY

(71) Applicant: DASSAULT SYSTEMES, Velizy Villacoublay (FR)

(72) Inventors: Guillaume Dayde, Grasse (FR); Christophe Delfino, Laurent du Var (FR)

(73) Assignee: DASSAULT SYSTEMES, Velizy Villacoublay (FR)

(*) Notice: Subject to any disclaimer, the term of this patent is extended or adjusted under 35 U.S.C. 154(b) by 59 days.

(21) Appl. No.: 14/984,414

(22) Filed: Dec. 30, 2015

(65) Prior Publication Data
US 2016/0189433 A1  Jun. 30, 2016

(30) Foreign Application Priority Data
Dec. 30, 2014  (EP) ..................................... 14307216

(51) Int. Cl.
| | |
|---|---|
| *G06T 19/20* | (2011.01) |
| *G06T 17/10* | (2006.01) |
| *G06F 3/0484* | (2013.01) |
| *G06F 3/0481* | (2013.01) |
| *G06T 7/11* | (2017.01) |

(52) U.S. Cl.
CPC .......... *G06T 19/20* (2013.01); *G06F 3/04815* (2013.01); *G06F 3/04842* (2013.01); *G06T 7/11* (2017.01); *G06T 17/10* (2013.01); *G06T 2200/24* (2013.01); *G06T 2210/12* (2013.01); *G06T 2219/2016* (2013.01)

(58) Field of Classification Search
None
See application file for complete search history.

(56) References Cited

U.S. PATENT DOCUMENTS 7,825,940 B1 * 11/2010 Vieilly .................... G06T 19/20
                                                         345/419
8,253,730 B1 *  8/2012 Carr ........................ G06T 15/06
                                                         345/419
(Continued)

FOREIGN PATENT DOCUMENTS

EP    2 800 064 A1   11/2014

OTHER PUBLICATIONS

Autodesk, "AutoCAD 2013 Command Reference Guide," 2012.*
(Continued)

*Primary Examiner* — Nicholas R Wilson
(74) *Attorney, Agent, or Firm* — Oblon, McClelland, Maier & Neustadt, L.L.P.

(57) ABSTRACT

A computer-implemented method for creating a set of bounding boxes on a three-dimensional modeled assembly in a three-dimensional scene. The method comprises providing three-dimensional modeled objects forming a three-dimensional modeled assembly in a three-dimensional scene; computing a main bounding box encompassing the three-dimensional modeled assembly, creating a set of three-dimensional modeled objects that meet at least one property of the three-dimensional modeled assembly, computing two or more bounding boxes encompassed by the main bounding box, one of the two or more bounding boxes comprising the three-dimensional modeled objects of the set.

11 Claims, 5 Drawing Sheets

(56) References Cited

U.S. PATENT DOCUMENTS

2013/0235050 A1* 9/2013 Karras ............... G06T 1/20
                                                                       345/505
2016/0034150 A1* 2/2016 Behr ............... G06F 3/04845
                                                                       715/771

OTHER PUBLICATIONS

Partial European Search Report dated Oct. 16, 2015 in European Patent Application No. 14307217.1.
Partial European Search Report dated Oct. 16, 2015 in European Patent Application No. 14307216.3.
Anonymous: "Using the ViewCube (Maya) Autodesk Knowledge Network", Sep. 9, 2014, XP055219222, Retrieved from the Internet: URL:http://knowledge.autodesk.com/support/maya/learn-explore/caas/CloudHelp/cloudhelp/2015/ENU/Maya/files/Viewing-the-scene-Using-the-ViewCube-htm.html [retrieved on Oct. 8, 2015].
Autodesk ads Max Learning Channel: "Using the ViewCube and SteeringWheels", Jan. 11, 2011, XP054976129, Retrieved from the Internet: URL:http://www.youtube.com/watch?v=egTFMIVwtpM [retrieved on Oct. 8, 2015].
Chaudhuri et al: "A simple method for fitting of bounding rectangle to closed regions", Pattern Recognition, Elsevier, GB, vol. 40, No. 7, Mar. 30, 2007, pp. 1981-1989, XP022009135.
Gopinath Taget: "Calculating tight bounding box around a solid—AutoCAD DevBlog", Sep. 1, 2013, XP055219673, Retrieved from the Internet: URL:http://adndevblog.typepad.com/autocad/2013/01/calculating-tight- bounding-box-around-a-solid.html [retrieved on Oct. 9, 2015].

* cited by examiner

CREATION OF BOUNDING BOXES ON A 3D MODELED ASSEMBLY

CROSS-REFERENCE TO RELATED APPLICATIONS

This application claims priority under 35 U.S.C. § 119 or 365 to European Application No. 14307216.3, filed Dec. 30, 2014. The entire teachings of the above application(s) are incorporated herein by reference.

FIELD OF THE INVENTION

The invention relates to the field of computer programs and systems, and more specifically to a method, system and program for creating a set of bounding boxes on a three-dimensional assembly of 3D modeled objects.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise.

The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

In CAD systems, bounding volume are widely used, for example for the purposes of culling or intersection tests. Typical bounding volumes are for example cubes, cylinder boxes or spheres. Generally speaking, the creation of bounding volumes relies only on the product structure of an assembly of 3D modeled object such that each 3D modeled object is enclosed in its own bounding box. However, a division of an assembly that relies only on the product structure is not always adapted when the purpose of bounding boxes is not culling or intersection tests. For instance, bounding boxes might be used for the purpose of manipulating the assembly.

Within this context, there is still a need for improving the creation a set of bounding boxes on a three-dimensional modeled assembly in a three-dimensional scene.

SUMMARY OF THE INVENTION

It is therefore provided a computer-implemented method of creating a set of bounding boxes on a three-dimensional modeled assembly in a three-dimensional scene. The method comprises providing three-dimensional modeled objects forming a three-dimensional modeled assembly in a three-dimensional scene, computing a main bounding box encompassing the three-dimensional modeled assembly, creating a set of three-dimensional modeled objects that meet at least one property of the three-dimensional modeled assembly, and computing two or more bounding boxes encompassed by the main bounding box, one of the two or more bounding boxes comprising the three-dimensional modeled objects of the set.

The method may comprise:
the at least one property of the three-dimensional modeled comprises at least one property of one or more three-dimensional modeled objects of the three-dimensional modeled assembly; and further comprising before the computing of the two or more bounding boxes: selecting, upon user action, at least one property of one or more three-dimensional modeled objects of the three-dimensional modeled assembly;
the step of computing the two or more bounding boxes further comprises: computing one set of points in the three-dimensional scene that represents outlines of the three-dimensional modeled objects of the created group; computing a barycenter of the said one set of points; computing the bounding box having said barycenter as center of the volume defined by the bounding box;
the at least one selected property is one among: a level in a product structure of the three-dimensional modeled assembly; a material parameter of the object; a color of the object;
the at least one property of the three-dimensional modeled assembly is dimensions of the three-dimensional modeled assembly in the three-dimensional scene;
a number n of computed bounding boxes enclosed in the main bounding box is determined according to the dimension of the mains of the three-dimensional modeled assembly;
the main bounding box and the two or more bounding boxes are one among a rectangular cuboid, a cube;
the main bonding box comprises at the maximum two adjoining superimposed bounding boxes about one direction of the main bounding box;
the computed two or more bounding boxes are represented in the three-dimensional scene with a minimal spacing between adjoining bounding boxes;
after the step of providing: computing a simplified view of the three-dimensional modeled assembly, the computed simplified view being a view of one three-dimensional object representing the assembly with a reduced scale and forming one single mesh; displaying on the simplified view the computed bounding boxes;

It is further provided a computer program comprising instructions for performing the above method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
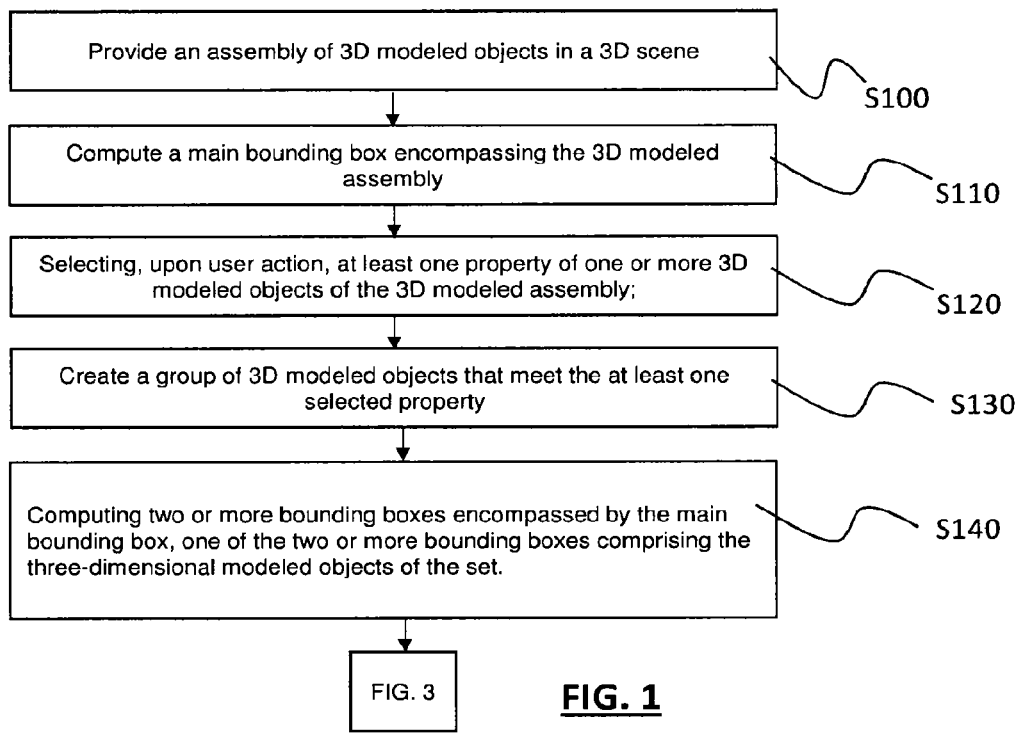
FIG. 1 shows a flowchart of an first example of the method.
Figure 2:
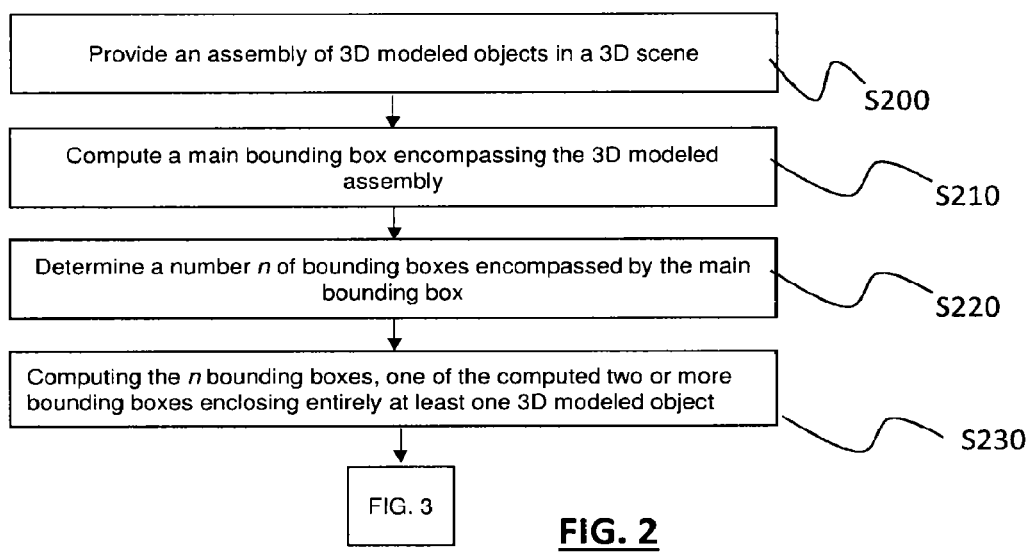
FIG. 2 shows a flowchart of a second example of the method.

With reference to the flowcharts of FIGS. 1 and 2, it is proposed a computer-implemented method for creating a set of bounding boxes on a three-dimensional (3D) modeled assembly in a 3D scene. The method comprises providing 3D modeled objects forming a 3D modeled assembly in a 3D scene. The method further comprises computing a main bounding box encompassing the 3D modeled assembly. The method also comprises the creation of a set of 3D modeled objects that meet at least one property of the 3D modeled assembly. The method further comprises computing two or more bounding boxes encompassed by the main bounding box. One of these two or more bounding boxes comprises the 3D modeled objects of the set. Said otherwise, the two or more bounding boxes are computed according to the created set of 3D modeled objects.

This method allows the division of a 3D modeled assembly according to specific needs of a system, a user, an application because the creation of bounding boxes is performed according to a group of objects of the 3D modeled objects forming the assembly. Interestingly, this group of objects can be obtained automatically. The system therefore selects the parameter(s) according to which the 3D modeled assembly is divided. This allows the system to optimize its resources consumptions for the creation of the set of bounding boxes. Alternatively, this group of objects can be obtained upon user selection of a property met by one or more three-dimensional modeled objects. Such a selection allows the user to create its own zones on the 3D modeled assembly depending on its needs.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of providing 3D modeled objects (S10 of FIGS. 1 and 2) may be triggered upon user action. As another example, the step S120 of selecting is also performed upon user action.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

In method of the present invention, the objects of the assembly of 3D modeled objects can be stored on a memory. The computed bounding boxes may also be stored on the memory.

By "database", it is meant any collection of data (i.e. information) organized for search and retrieval. When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

The method generally manipulates modeled objects, e.g. representing a product such as a part or an assembly of parts, or possibly an assembly of products. A modeled object is any object defined by data stored in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

A CAD system may be history-based. In this case, a modeled object is further defined by data comprising a history of geometrical features. A modeled object may indeed be designed by a physical person (i.e. the designer/user) using standard modeling features (e.g. extrude, revolute, cut, and/or round etc.) and/or standard surfacing features (e.g. sweep, blend, loft, fill, deform, smoothing and/or etc.). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e. boundary representation). The B-rep is the result of the computations defined in the history. The shape of the part displayed on the screen of the computer when the modeled object is represented is (a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is meant any system adapted for the management of a modeled object representing a physical manufactured product. In a PLM system, a modeled object is thus defined by data suitable for the manufacturing of a physical object. These may typically be dimension values and/or tolerance values. For a correct manufacturing of an object, it is indeed better to have such values.

CAM stands for Computer-Aided Manufacturing. By CAM solution, it is meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

CAE stands for Computer-Aided Engineering. By CAE solution, it is meant any solution, software of hardware, adapted for the analysis of the physical behavior of modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allows the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Interestingly, the present invention is not limited to CAD/CAE/CAM/PDM or PLM systems, and it can be used with any system that uses 3D representations of objects and that may be dedicated to non-CAD users, e.g. system for performing technical illustrations, maintenance or training operations, assembly presentation, interactive application such as interactive parts catalogues, a designing/authoring system . . . It is to be understood that the modeled objects may be defined by different kinds of data.

Figure 5:
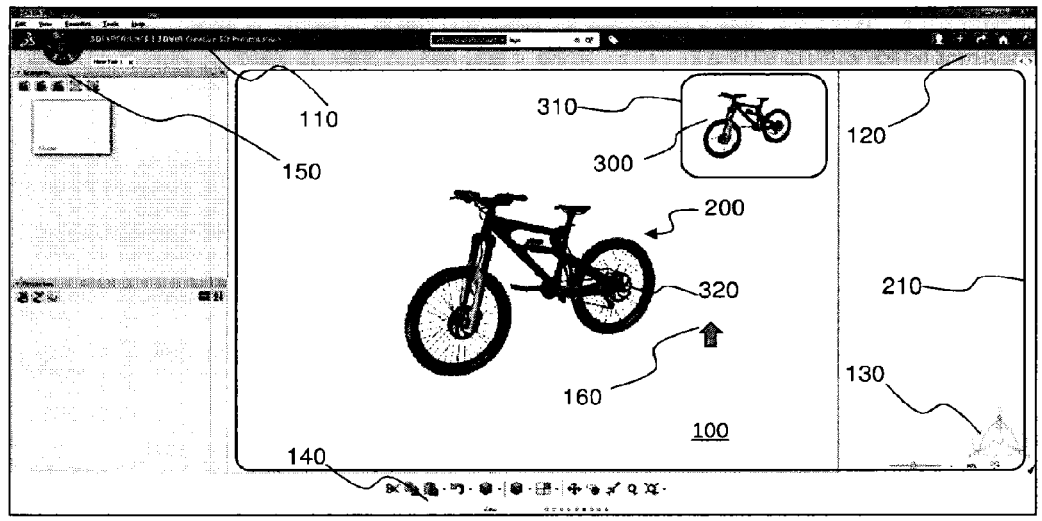
FIG. 5 shows an example of a graphical user interface of the system.

FIG. 5 shows an example of a GUI of a system for performing technical illustrations. The present method can be used with any kind GUI.

The GUI 100 may be a typical CAD-like interface, having standard menu bars 110, 120, as well as bottom 140 and side toolbars. Such menu- and toolbars contain a set of user-selectable icons, each icon being associated with one or more operations or functions, as known in the art. Some of these icons are associated with software tools, adapted for editing and/or working on the 3D modeled object 200 displayed in the GUI 100. It is to be understood that the 3D modeled object 200 is a 3D modeled assembly of 3D modeled objects. The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. adding an annotation for completing the technical illustration). As another example, the designer may pre-select a part of the object 200 and then edit geometrical constraints by selecting an appropriate icon. For example, typical CAD operations are the modeling of the punching or the folding of the 3D modeled object displayed on the screen.

The GUI 100 may further show various types of graphic tools 130, 150 for example for facilitating 3D orientation of the object, for triggering a simulation of an operation of an edited product or render various attributes of the displayed product 200. A cursor 160 may be controlled by a haptic device to allow the user to interact with the graphic tools.

Figure 10:
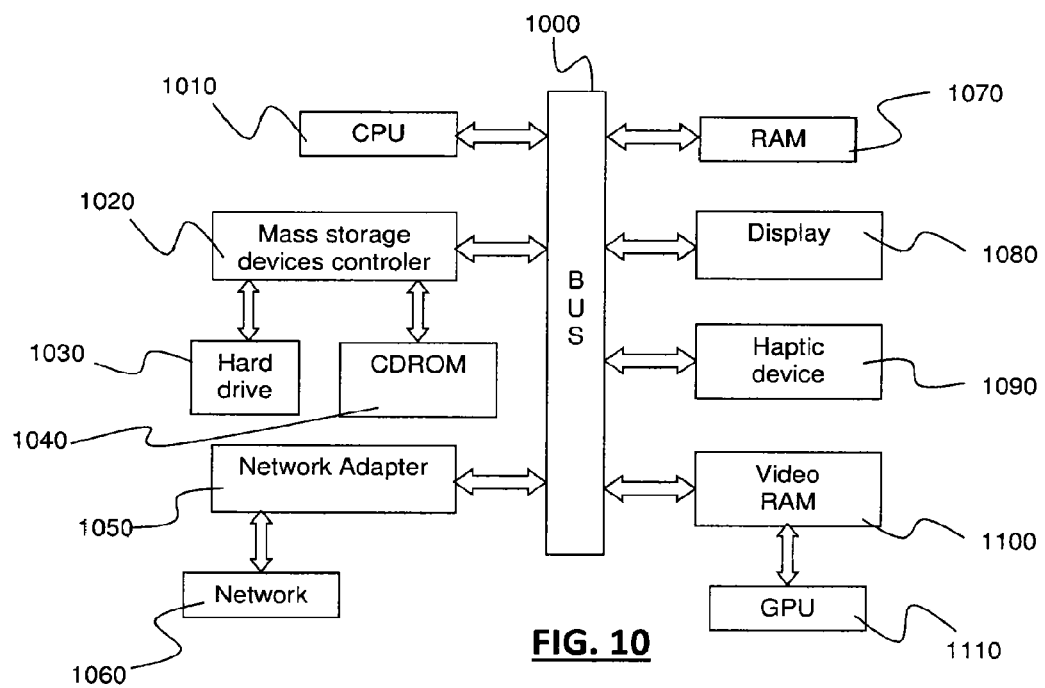
FIG. 10 shows an example of a system for performing the present method.

FIG. 10 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring now to FIG. 1, at step S100, 3D modeled objects forming a 3D modeled assembly in a 3D scene are provided. Providing 3D modeled objects means that the objects are available to the system performing the present method. The 3D modeled objects may be displayed, e.g. on the display 1080 of the system of FIG. 10.

Figure 4:
FIG. 4 shows an example of a view of a 3D modeled assembly of 3D modeled objects.

FIG. 4 shows an example of a 3D modeled assembly of 3D modeled object: here a bike is modeled. FIG. 5 shows the bike 200 of FIG. 4 displayed on the GUI 100. The 3D modeled assembly is displayed within a 3D scene. The 3D scene is a space in which spatial relationships between 3D objects are described, e.g. the 3D modeled object forming the bike are position and oriented in the 3D scene.

Next, at step S110 of FIG. 1, a main bounding box encompassing the 3D modeled assembly is computed. This is performed as known in the art. As a result, all the provided objects of step S100 are enclosed in the main bounding box.

Then, at step S120, the user performs the selection of at least one property of one or more 3D modeled objects provided at step S100. The property may be, but is not limited to, a physical property of the object such as material parameter of the object, rendering property of the object such as its color, the level of an object in the product structure of the 3D modeled assembly, a property of the database on which the 3D modeled is stored—the database can be a PLM database—, a property that is created by the user from any attribute of an object of the assembly . . . Generally speaking, the term property can encompass any characteristic of the object(s). For instance, the creation date of an object, the position of the object in the 3D scene, the designer allowed to work on the object (or any other read/write/execute access right . . . ), are attributes related to one or more objects, and therefore are properties of the object(s).

Next, at step S130, a group of 3D modeled objects is created. It is to be understood that the group can comprises one or more 3D modeled objects. The objects of the group meet the one or more properties selected by the users. For instance, if the user selected the property "blue objects", a group of objects rendered in blue (or to be rendered in blue) is created.

An object can belong to several groups when two or more properties are selected by the user. In such a case, the number of groups an object can belong to may be limited; for instance, an object cannot belong to more than three groups. This advantageously limits the number of groups. In addition, priority rules may exist between the properties of an object. The object that might belong to several groups will belong to the group associated with the property having the highest priority.

Now, at step S140, two or more bounding boxes are computed. These bounding boxes are encompassed in the main bounding box; said otherwise, they are completely enclosed in the main bounding box. One of these two or more bounding boxes comprises the 3D modeled objects that belong the group created at step S130. Said otherwise, the 3D objects of the group are enclosed in one of the said two or more bounding boxes.

In practice, the computing of the bounding boxes relies on the positions of the objects in the 3D scene. In an example, the bounding boxes are computed by identifying barycenter in a system of weighted points. In a first step, a cloud of points is computed in the 3D scene wherein the points represents the outlines of the 3D modeled objects of a created group. Then, this is successively performed for all the groups of objects, including objects that do not belong to a group. The cloud of points thus comprises points that belong to groups (e.g. a particular color is given to points according to the group they belong to), and the points of the cloud are weighted, e.g. according to the volume of or the number of triangles of the object where it came from. Next, for each points of a given group, the barycenter is computer, as known in the art. And then, a bounding box for the group of 3D modeled objects is computed that uses the barycenter as center of the volume defined by the bounding box. This is performed for each group. Importantly, there is no recovery of overlap or intersection between the computed bounding boxes.

Figure 8A:
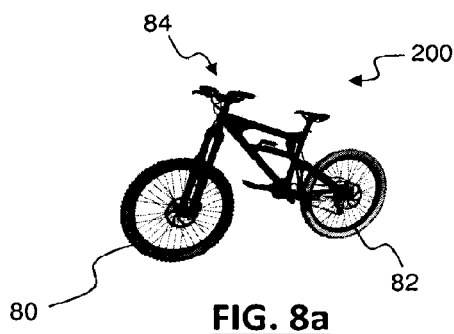
FIGS. 8a to 8b show an example of the display of the bounding boxes obtained according to the present invention.
Figure 8B:
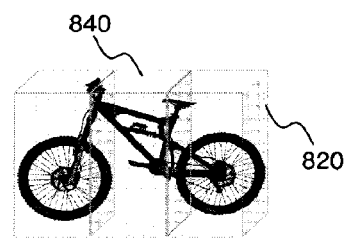

Referring now to FIGS. 8*a* and 8*b*, it is shown an example of bounding boxes computed according to the invention after that the user has selected for property sub-assemblies of the product structure. More precisely, the user has selected the properties "Front wheel" and "Rear wheel" so that two groups of objects that meet this property of the 3D modeled assembly 200 are now formed: the first group comprises the objects that belong to the rear wheel and the second group comprises the objects that belong to the front wheel. Implicitly, a third group of object is created, i.e. the objects of the set that do not belong to the first and second group (that is, that are not concerned by the selected property). Three bounding boxes are now computed for each group of objects, as shown on FIG. 8*b*. In this example, the entire volume defined by the main bounding box (not represented) is used by the computed bounding boxes, but also there is only one bound box 800, 820, 840 for each group (here three groups). Moreover, in this example, the main bounding box and the other computed bounding boxes 800, 820, 840 can be only rectangular cuboid. It results that the three bounding boxes 800, 820, 840 are arranged as shown on FIG. 8*b*.

Figure 9A:
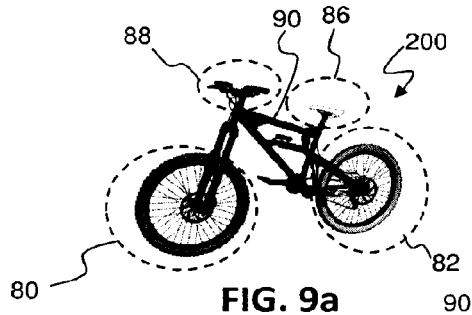
FIGS. 9a to 9b show an example of the display of the bounding boxes obtained according to the present invention.
Figure 9B:
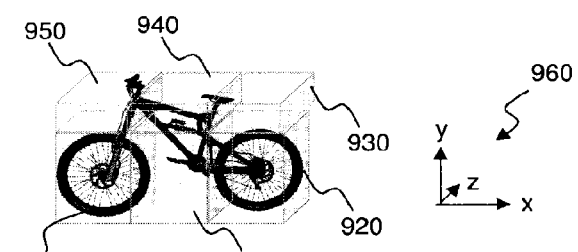

Referring now to FIGS. 9*a* and 9*b*, it is shown an example of bounding boxes computed according to the invention after that the user has selected for property the color of the objects. The user has selected four colors as properties, namely red, green, yellow and pink. Five groups have been identified as a result of this user selection: the first group corresponds to the front wheel 80 that is in red, the second one corresponds to the rear wheel 82 that is in green, the third one is the seat 86 in yellow, the fourth one is handle bar 88 in pink, and the last (implicit) group of 3D modeled objects is the bike frame 90. Each group of object is surrounded by a dotted circle. Six bounding boxes 900, 910, 920, 930, 940, 950 have been computed as shown on FIG. 9*b*. In this example, it is a requirement of the system that the entire volume defined by the main bounding box (not represented) has to be used by the computed bounding boxes, and that the computed bounding boxes are rectangular cuboid. It results that the sixth bounding boxes are arranged as shown on FIG. 9*b*. Interestingly, the bounding box 930 is an empty one, that is, no object is enclosed (totally or partially) in this bounding box. The bounding box 930 has been created for the purpose of compliance with the following two additional requirements of the system: (i) for one direction of the main bounding box, the main bonding box comprises at the maximum two adjoining superimposed bounding boxes about, and (ii) an interface between the two adjoining superimposed bounding boxes for said one direction of the main bounding box form a layer in the main bounding box, said layer limiting the extension of the other bounding boxes. This allows to create a regular division of the main bounding box; the user can more easily understand how the 3D modeled assembly have been divided. In FIG. 9*b*, the number of superimposed bounding boxes is limited to two in the direction 'y' (of the reference frame 960 that provides an orientation of the main bounding box); this is not the case for instance for the direction 'x'. In addition, the bounding boxes 950 and 900 creates an layer (not represented) in the direction 'y', and this layer cannot be crossed by any other bounding box. Therefore, all the other superimposed bounding boxes 940, 910 and 930, 920 are on both side of this layer.

Referring now to FIG. 2, it is discussed another example wherein the system automatically selects one or more properties of the three-dimensional modeled assembly.

At step S200, an assembly of 3D modeled objects is provided in a 3D scene. This step is similar as the step S100.

Then, at step S210, a main bounding box encompassing the 3D modeled assembly is computed. This step is similar as the step S110.

Next, at step S220, a number n of computed bounding boxes encompassed by the main bounding box is determined by the system. The number n depends on the size of the 3D modeled assembly. The term size means the dimensions of the 3D modeled assembly about its reference frame, that is, the length, width and height of the 3D modeled assembly. The dimensions of the 3D modeled object thus determines the minimal size of a rectangular cuboid or cubic bounding box. Hence, the number of bounding boxes enclosed in the main bounding box can be determined from the dimension of the 3D modeled assembly. For instance, the minimal size of the enclosed bounding boxes can be determined from a ration between the sizes of the main bounding box and of enclosed bounding boxes. In practice, the ratio is such that each enclosed bounding box is readily identifiable by the user.

Once the number n is determined, the dimensions of the enclosed bounding box can be computed. In practice, the n bounding boxes have are also compliant with the following rules: (i) for one direction of the main bounding box, the main bonding box comprises at the maximum two adjoining superimposed bounding boxes about, (ii) an interface between the two adjoining superimposed bounding boxes for said one direction of the main bounding box form a layer in the main bounding box, said layer limiting the extension of the other bounding boxes, (iii) the entire volume defined by the main bounding box has to be used by the computed bounding boxes, and (iv) the computed bounding boxes are rectangular cuboids or cubes.

Figure 6:
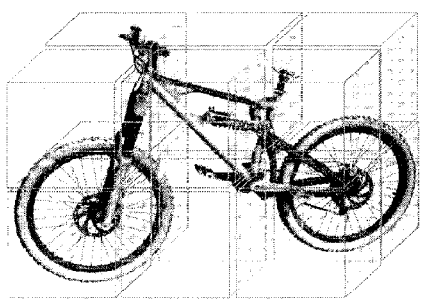
FIG. 6 shows an example of the display of bounding boxes.

FIG. 6 shows an example of bounding boxes encompassed by the main bounding box that are determined by the system. Twelves cubes rectangular cuboids are enclosed in the main bounding box (not represented), and these twelves bounding boxes have the same dimensions.

Figure 7:
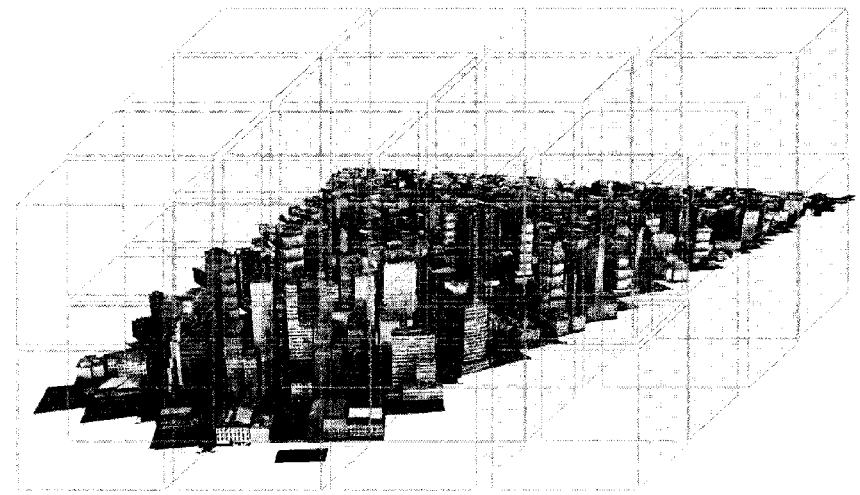
FIG. 7 shows an example of the display of bounding boxes.

FIG. 7 shows another example of enclosed bounding boxes that are determined by the system by using the size property of the 3D modeled assembly.

The computed bounding boxes (the main and the enclosed ones) can be represented to the user. For instance, they can be directly shown on the 3D modeled assembly. This is performed as known in the art.

Figure 3:
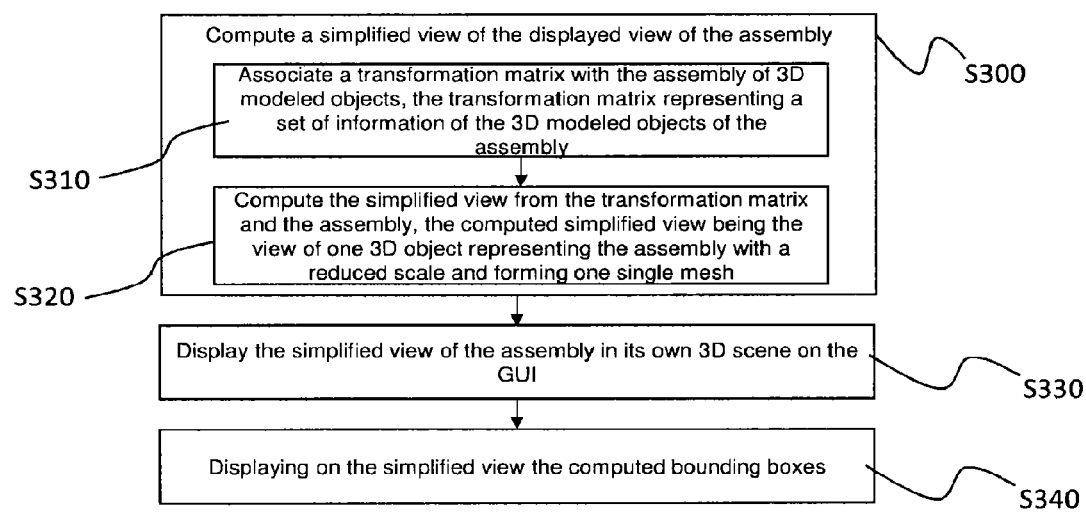
FIG. 3 shows a flowchart of an example of the display of the bounding boxes obtained according to the present invention.

Alternatively, they can be shown on a simplified view of the view of the 3D modeled assembly. The flowchart of FIG. 3 shows an example of a method for displaying the bounding boxes computed according to the present invention.

At step S300, a simplified view of the 3D modeled assembly is computed. The expression simplified view means that the graphical elements of said view are not partitioned according to the individual objects of the assembly, from a system standpoint. This involves that no object can be selected by the user on the simplified view. Said otherwise, the set of objects as represented in the simplified view is not content addressable and a user may not select any individual object composing the assembly displayed in the view. The user thus sees a simplified model of the assembly.

The simplified view may be a dimmed white colored model, being understood that any other color may be used. The color is preferably unified; this advantageously allows to distinguish it from the original model on the GUI and it enhance the objects related to the information provided. In addition, no material or texture are applied on the representation of the simplified view; this allows a faster computing and rendering of the simplified view and less memory is required.

The computing of the simplified view may comprise a step S310 of associating a transformation matrix with the assembly of 3D modeled objects. The transformation matrix represents a set of information relative to the 3D modeled objects of the assembly. In this context, the term association means that data representing the transformation matrix are stored together with data representing said one object; the data can be physically stored (for instance in a same file) or stored logically (for instance in two files with a pointer from a file to a second one).

The transformation matrix aims at providing a linear transformation between two spaces, as known in the art. For instance, the transformation matrix allows transformation from the 3D space of the assembly to the 3D space of the simplified view. The transformation matrix allows to perform operations such as, but limited to, translation, rotation, scaling on the assembly (or on a sub-assembly, or on a 3D modeled object) in the 3D space. Interestingly, the transformation matrix can be easily inverted such that an operation on the simplified view can be applied on the assembly.

The set of information represented by the transformation matrix comprises at least an orientation and a position of the assembly in the 3D scene. The orientation and positions of the assembly are defined as the orientation and position of a reference frame—for instance a frame of three axis (x,y, z)—attached to the assembly relative to the global frame (also referred to as frame of reference) of the 3D scene, as known in the art. The set of information further comprises a scale factor, which is the same (that is, the same value) as the one that is used for obtaining the simplified view representing the assembly with a reduced scale.

An association is created between the assembly of 3D modeled objects and the transformation matrix so that is possible to create a link between the assembly located in a first 3D space and the simplified view located in a second 3D space. Interestingly, one transformation matrix may be associated with each object of the assembly: this means that the assembly is associated with as many transformation matrices as objects in the assembly, and one transformation matrix comprises a set of information related to one of the objects of the assembly. Said otherwise, the assembly is associated with a transformation matrix for each object of the assembly. This advantageously allows to improve the accuracy of the link created between the simplified view and the assembly as the granularity used is the object and not the set of objects forming the assembly.

Next, at step S320, the simplified view is computed from the transformation matrix and the assembly of 3D modeled objects. This is performed as known in the art. The computed simplified view is the view of a 3D object (also referred to simplified model) representing the assembly with a reduced scale, e.g. with a scale factor of 1/10 (the simplified view is ten times smaller than the assembly of objects). Reducing the scale is different than a zoom out which is a manipulation of the representation so as to make it smaller only, while reducing the scale involves that a transformation (a shrinking) of the objects forming the assembly is carried out before obtaining a representation.

Moreover, the said one 3D object (or simplified model) forms one single mesh. This means that only one mesh is obtained as an aggregate of sub-meshes, wherein each sub-mesh is the mesh of an object of the assembly. Thus, an aggregate representation is processed to form a view to be rendered next. The aggregation of the meshes is performed as known in the art. The term mesh means a set of vertices, edges and faces that defines the shape of a modeled object in 3D. In practice, the faces may be triangles, quadrilaterals, or other simple convex polygons. The mesh of the simplified view if thus a simplified mesh compared to the mesh of the assembly; less memory is required for displaying the simplified view.

The computing step S320 may be preceded by a simplification based on various criteria, such as a threshold size (possibly user parameterized) or sag, that is, an entry parameter used for tessellated representations of the objects, as known in the art. Hence, not all the parts of the set need be used during the aggregation (for example, rivets of a plane would be discarded if the entire airplane is displayed). Further, parts contained in other parts (therefore masked) need not be used in the aggregation. Other criteria may be used to discard some of the objects, for example user selectable categories of parts.

Interestingly, the computed simplified view makes a critical difference in terms of memory required to display the view. Indeed, while the simplified view typically requires a few memory resources (for instance several Kbytes), a view containing all representations of the parts may require up to thousands of megabytes to be loaded in the computer memory. Thanks to the scale reduction and the computing of one single mesh, the view is more rapidly computed and rendered.

Next, at step S330, the simplified view obtained from the computing step S300 is displayed within the 3D scene on the GUI. The 3D space wherein the simplified view is displayed is not the same as the one wherein the assembly is displayed. Said otherwise, the assembly of 3D modeled object is displayed in a first 3D scene and the simplified view of the assembly of 3D modeled object is displayed in a second 3D scene, both scene being displayed on the same GUI. Said otherwise, the simplified view is displayed in a 3D scene which is different from the 3D scene of the displayed assembly.

In practice, this is performed by displaying two windows on the GUI, as illustrated on FIG. 5. The bike 200 and the simplified view 300 of the simplified model are displayed on the same GUI 100, but in two different windows. The window 310 shows the 3D space wherein the simplified view 300 is displayed and the window 210 shows the 3D space wherein the assembly 200 is displayed; these two 3D spaces are not the same: they have their own global orientation.

Next, at step S340, the computed bounding boxes are displayed on the simplified view. The positioning of bounding boxes on the simplified view is computed with the transformation matrix. In practice, the (mathematical) product between coordinates of the bounding boxes in the 3D scene and the transformation matrix provides new coordinates of the said bounding boxes in the 3D scene of the simplified view.

The preferred embodiments of the present invention has been described. It will be understood that various modifications may be made without departing from the spirit and scope of the invention. Therefore, other implementations are within the scope of the following claims.

The invention claimed is:
1. A computer-implemented method for creating a set of bounding boxes on a three-dimensional modeled assembly of CAD three-dimensional modeled objects that represents a product in a three-dimensional scene, the computer-implemented method comprising:
provid ing the three-dimensional modeled objects forming the three-dimensional modeled assembly in the three-dimensional scene;
computing a main bounding box encompassing the three-dimensional modeled assembly;
selecting, upon user action, at least one property of one or more of the three-dimensional modeled objects of the three-dimensional modeled assembly;
for each selected property, creating a group of one or more of the three-dimensional modeled objects that meet the selected property; and
computing two or more bounding boxes encompassed by the main bounding box, a bounding box being computed for each created group and comprising the one or more three-dimensional modeled objects of the group.

2. The computer-implemented method of claim 1, wherein said computing the two or more bounding boxes further comprises:
computing one set of points in the three-dimensional scene that represents outlines of the three-dimensional modeled objects of the created group;
computing a barycenter of the said one set of points; and
computing the bounding box having said barycenter as center of the volume defined by the bounding box.

3. The computer-implemented method of claim 1, wherein the at least one selected property is one among:
a level in a product structure of the three-dimensional modeled assembly;
a material parameter of the object; and
a color of the object.

4. The computer-implemented method of claim 1, wherein the selected property is dimensions of the three-dimensional modeled assembly in the three-dimensional scene.

5. The computer-implemented method of claim 4, wherein a number n of computed bounding boxes enclosed in the main bounding box is determined according to a dimension of the main bounding box encompassing the three-dimensional modeled assembly.

6. The computer-implemented method of claim 1, wherein the main bounding box and the two or more bounding boxes are one among a rectangular cuboid and a cube.

7. The computer-implemented method of claim 6, wherein the main bounding box comprises at a maximum two adjoining superimposed bounding boxes about one direction of the main bounding box.

8. The computer-implemented method of claim 1, wherein the computed two or more bounding boxes are represented in the three-dimensional scene with a spacing between adjoining bounding boxes.

9. The computer-implemented method of claim 1, further comprising after said providing:
computing a simplified view of the three-dimensional modeled assembly, the computed simplified view being a view of one three-dimensional object representing the three-dimensional modeled assembly with a reduced scale and forming one single mesh; and
displaying on the simplified view the computed bounding boxes.

10. A non-transitory computer readable storage medium having recorded thereon a computer program that when executed by a computer causes the computer to execute the method of claim 1.

11. A computer system comprising processing circuitry coupled to a memory and a graphical user interface, the memory haying recorded thereon instructions that when executed by the processing circuitry causes the processing circuitry to be configured to
provide CAD three-dimensional modeled objects forming a three-dimensional modeled assembly representing a product in a three-dimensional scene;
compute a main bounding box encompassing the three-dimensional modeled assembly;
selecting, upon user action, at least one property of one or more three-dimensional modeled objects of the three-dimensional modeled assembly;
create, for each selected property, a group of one or more three-dimensional modeled objects that meet the selected property; and
compute two or more bounding boxes encompassed by the main bounding box, a bounding boxes a bounding box being computed for each created group and comprising the one or more three-dimensional modeled objects of the group.

* * * * *